Oct. 24, 1939.   J. F. PIERCE   2,177,394
EXTENSIBLE VEHICLE BODY
Filed Nov. 16, 1937   2 Sheets-Sheet 1

James F. Pierce
INVENTOR
BY Victor J. Evans & Co.
ATTORNEYS

Oct. 24, 1939.  J. F. PIERCE  2,177,394
EXTENSIBLE VEHICLE BODY
Filed Nov. 16, 1937   2 Sheets-Sheet 2
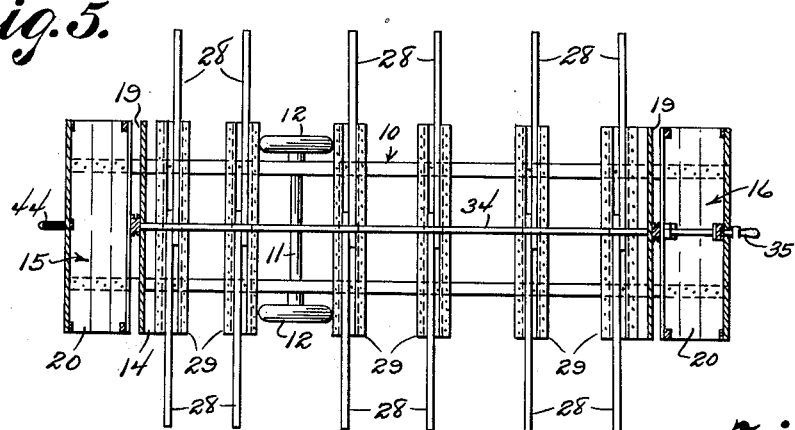

Patented Oct. 24, 1939

2,177,394

UNITED STATES PATENT OFFICE 2,177,394

EXTENSIBLE VEHICLE BODY

James F. Pierce, Chase, Mich., assignor of one-fourth to Arthur J. Drilling, Baldwin, Mich.

Application November 16, 1937, Serial No. 174,864

3 Claims. (Cl. 296—26)

The invention relates to an expansive vehicle body and more especially to an extensible vehicle body either of the passenger or commercial kind.

The primary object of the invention is the provision of a body of this character, wherein the sides of the same are so arranged that the body can be enlarged for increasing the interior capacity of such body, these sides being controllable for the extension and contracting activity thereof in a single operation.

Another object of the invention is the provision of a body of this character, wherein the sides of the same are telescopically arranged therewith so that such sides can increase or decrease the capacity of the body at the will of the user.

A further object of the invention is the provision of a body of this character, wherein the construction thereof makes it especially available for trailers used by tourists in camping during tours, the body being of novel construction and readily and easily controlled.

A still further object of the invention is the provision of a body of this character, which is simple in its construction, thoroughly reliable and effective in operation, neat in its appearance, thoroughly serviceable, easy of control and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 5 is a sectional view on the line 5—5 of Figure 3 looking in the direction of the arrows.

Figure 6 is a detail perspective view of the extension rails in association with the guide therefor.

Figure 7 is a fragmentary perspective view of one of the extensible sides of the body removed.

Figure 8 is a fragmentary perspective view of the vehicle body proper with the extensible sides removed.

Figure 9 is a sectional view on the line 9—9 of Figure 4 looking in the direction of the arrows.

Figure 10 is a fragmentary detail sectional view taken on the line 10—10 of Figure 9 looking in the direction of the arrows.

Similar reference characters indicate corresponding parts throughout the several views in the drawings.

Figure 1:
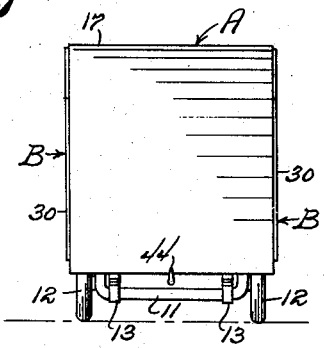
Figure 1 is a front elevation of the vehicle body constructed in accordance with the invention and shown with the sides in normal contracted position.
Figure 2:
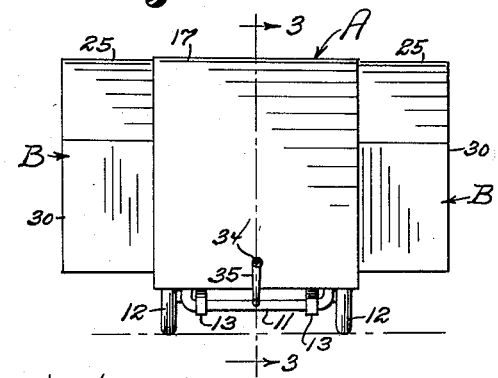
Figure 2 is a rear elevation of the body with the sides extended.
Figure 3:
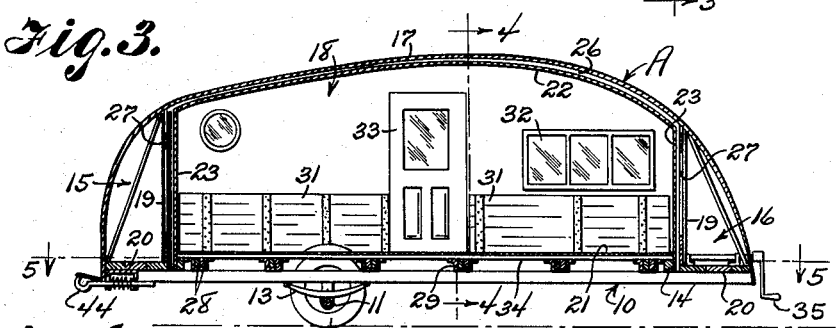
Figure 3 is a sectional view taken on the line 3—3 of Figure 2 looking in the direction of the arrows.
Figure 4:
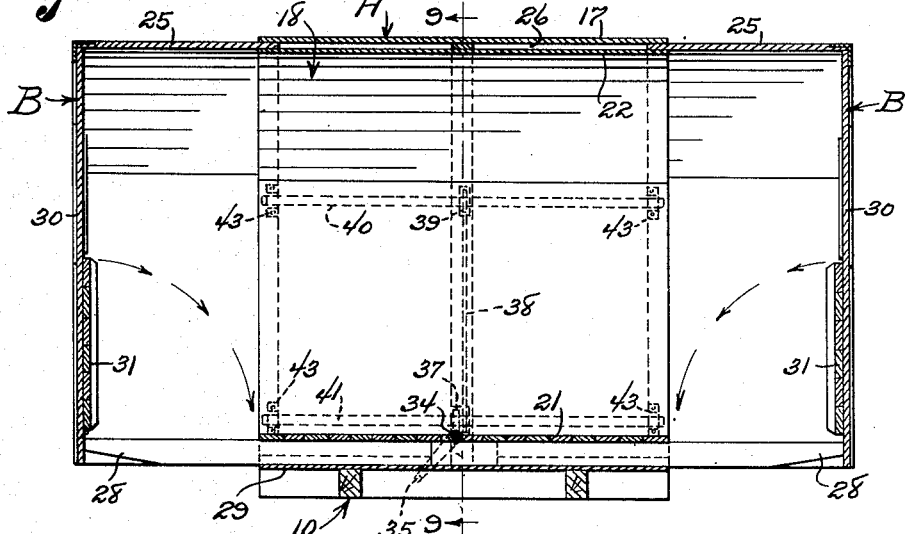
Figure 4 is an enlarged sectional view taken on the line 4—4 of Figure 3 looking in the direction of the arrows.

Referring to the drawings in detail, A designates generally the main permanent body of a vehicle and B the side extension sections thereof, respectively. The body A with the sides B in association therewith is supported on a suitable chassis 10 equipped with a suitable wheel axle 11 carrying the traction wheels 12, there being springs 13 interposed between the said axle 11 and the chassis 10.

The main body A is formed with a floor frame 14 superimposed and made secure to the chassis 10 while at the fore and aft ends of said body A are vestibules 15 and 16, respectively, these being permanently closed at the sides and top, the roofing 17 of the body A being carried over the vestibule 16 and permanently closes the top thereof. These vestibules 15 and 16 are accessible from the interior 18 of the body A through suitable vertical partitions or paneling 19 separating the interior 18 from the said vestibules 15 and 16, respectively.

There is suitable flooring 20 arranged within the vestibules 15 and 16 while the floor frame 14 carries a flooring 21 for the interior 18 of the body A. This body A at opposite sides between vestibules 15 and 16 is open, there being a ceiling 22 and a walling 23, respectively, at the interior 18 of the body A. This ceiling 22 is separated the required distance from the roofing 17 while the walling 23 is spaced from the partitions or panels 19, which latter extend crosswise with respect to the length of the said body A. The side sections B are adapted for lateral shifting inwardly toward and away from the body A and are telescopically engaged at the side walls 24 and roofing 25 to said sections B within the spaces 26 and 27, respectively, created by separating the ceiling 22 and the walling 23 as before stated.

These sections B at their bottoms are open and have fitted in such open bottoms runner rails 28 slidably engaging guide casements or channeled tracks 29 fitted transversely to the longitudinal extent on the floor frame 14 while swingingly carried at the outside walls 30 on the inner faces thereof are floor sections 31, which, in usable position, are lowered onto the rails 28 when the sections B have been extended or moved outwardly from within the body A to their maximum extent and these floor sections 31 match and are flush with the floor 21 closing the open bottoms of the said sections B when extended. On moving the sections B inwardly of the body A, the floor sections 31 are swung upwardly against the inner faces of the outermost walls 30 of the said sections B. These walls each may be provided with suitable windows 32 and a door 33, respectively; while only one of the sections B may be equipped with the door 33, if desired.

Suitably journaled at the longitudinal center of the body A following the floor line 21, is a turning shaft 34 which at one end is carried outwardly at the rear end of the body and has fitted thereto a hand crank 35 for the turning of the same. This shaft is equipped at the point of location of the panel 19 separating each vestibule from the interior 18 of the body A with a worm screw 36 meshing with a worm gear 37 cooperating with chain and sprocket connections 38 and 39, respectively, actuating upper and lower feed shafts 40 and 41, respectively, the sprockets 39 being fixed to the said shafts centrally thereof. These shafts are reversely threaded at 42 in screw follower brackets 43 fixed to the sides 24 of the sections B, the said shafts 40 and 41 being arranged horizontally in their upper and lower disposition crosswise of the body A and within suitable clearances both for the said shafts 40 and 41 and the worm gear 37 and sprockets 39 provided in the walling 23. On rotating the shaft 34, the chains and sprockets 38 and 39 are set in action for the working of the shafts 40 and 41 for causing the extension or contracting of the sections B with respect to the body A and when these sections B are extended, the said body A is materially increased in its capacity at the interior 18 thereof.

The rails 28 traveling in the guides or tracks 29 prevent any possibility of sagging of the sections B when extended with respect to the body A and additionally in the telescopic interfitting of these sections B with the body A.

At the fore or front end of the body A is arranged thereon a suitable draft hitch 44 for the attachment of the vehicle to a draft medium such, for example, as a motor vehicle or the like.

Normally the sections B are contracted or moved inwardly of the body A although such sections B can be extended at will.

The tracks 29, while preferably made from metal, may be made from wood and in the form of casements secured to the under side of the stationary flooring.

What is claimed is:

1. A vehicle body having permanent bottom, ends, top and open sides, end walls within said body next to the ends thereof for forming pockets at said ends, a ceiling at the top of the body and carried to the said wall for a continuation of the said pockets at the top of the body, body extensions fitting the open sides of the body and each having sides and a top slidably telescoped in said pocket, means having connection with the body extensions and operated without the body at one point thereof for simultaneously moving the said body extensions inwardly and outwardly, runner rails fitted with the body extensions, channeled tracks built in the vehicle body and accommodating said runner rails, the runner rails and the said tracks being disposed between the end walls transversely of the vehicle body, and foldable floor sections carried by the body extensions and resting upon the runner rails when the said body extensions are moved outwardly.

2. A vehicle body having permanent bottom, ends, top and open sides, respectively, body extensions slidably fitting the open sides, and end walls and ceiling formations interiorly of the vehicle body and constituting pockets for the telescopic fitting therein of the body extensions.

3. A vehicle body having permanent bottom, ends, top and open sides, respectively, body extensions slidably fitting the open sides, end walls and ceiling formations interiorly of the vehicle body and constituting pockets for the telescopic fitting therein of the body extensions, and means having connections with the body extensions and operated for simultaneously moving the same inwardly and outwardly of the pockets.

JAMES F. PIERCE.